United States Patent
Lee et al.

(10) Patent No.: US 9,546,558 B2
(45) Date of Patent: Jan. 17, 2017

(54) DAMPING RESONATOR WITH IMPINGEMENT COOLING

(75) Inventors: Ching-Pang Lee, Cincinnati, OH (US);
Danning You, Oviedo, FL (US);
Reinhard Schilp, Orlando, FL (US);
Chander Prakash, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1958 days.

(21) Appl. No.: 12/832,116

(22) Filed: Jul. 8, 2010

(65) Prior Publication Data

US 2012/0006028 A1    Jan. 12, 2012

(51) Int. Cl.
*F02C 7/12* (2006.01)
*F01D 9/02* (2006.01)
*F23R 3/06* (2006.01)

(52) U.S. Cl.
CPC .............. *F01D 9/023* (2013.01); *F02C 7/12* (2013.01); *F23R 3/06* (2013.01); *F05D 2260/96* (2013.01); *F23R 2900/00014* (2013.01)

(58) Field of Classification Search
CPC .............. F02C 7/12; F01D 9/023; F23R 3/06
USPC ... 60/752, 754, 755, 756, 759, 725; 181/293
See application file for complete search history.

(56) References Cited

U.S. PATENT DOCUMENTS

| | | | |
|---|---|---|---|
| 2,807,931 A | 10/1957 | Bodine, Jr. | |
| 3,848,697 A | 11/1974 | Jannot et al. | |
| 4,199,936 A | 4/1980 | Cowan et al. | |
| 4,555,433 A * | 11/1985 | Jablonka et al. | 428/166 |
| 4,773,593 A * | 9/1988 | Auxier et al. | 239/127.3 |
| 5,373,695 A | 12/1994 | Aigner et al. | |
| 5,685,157 A | 11/1997 | Pandalai et al. | |
| 6,113,349 A | 9/2000 | Bagepalli et al. | |
| 6,351,947 B1 | 3/2002 | Keller et al. | |
| 6,508,331 B1 | 1/2003 | Stuart | |
| 6,530,221 B1 | 3/2003 | Sattinger et al. | |
| 6,546,729 B2 | 4/2003 | Hellat et al. | |
| 6,640,544 B2 | 11/2003 | Suenaga et al. | |
| 7,089,741 B2 * | 8/2006 | Ikeda et al. | 60/725 |
| 7,311,175 B2 | 12/2007 | Proscia et al. | |
| 7,413,053 B2 | 8/2008 | Wasif et al. | |
| 7,461,719 B2 | 12/2008 | Tobik et al. | |
| 7,549,506 B2 | 6/2009 | Sattinger | |
| 2004/0060295 A1* | 4/2004 | Mandai et al. | 60/725 |
| 2005/0034918 A1 | 2/2005 | Bland et al. | |
| 2010/0005804 A1 | 1/2010 | Chen et al. | |
| 2011/0138812 A1* | 6/2011 | Johnson | 60/725 |
| 2011/0179795 A1* | 7/2011 | Johnson et al. | 60/725 |

* cited by examiner

*Primary Examiner* — Jacob Amick

(57) ABSTRACT

A resonance chamber (42) has an outer wall (32) with coolant inlet holes (34A-C), an inner wall (36) with acoustic holes (38), and side walls (40A-C) between the inner and outer walls. A depression (33A-C) in the outer wall has a bottom portion (50) that is close to the inner wall compared to peaks (37A-C) of the outer wall. The coolant inlet holes may be positioned along the bottom portion of the depression and along a bottom portion of the side walls to direct coolant flows (44, 51) toward impingement locations (43) on the inner wall that are out of alignment with the acoustic holes. This improves impingement cooling efficiency. The peaks (37A-C) of the outer wall provide volume in the resonance chamber for a target resonance.

20 Claims, 5 Drawing Sheets

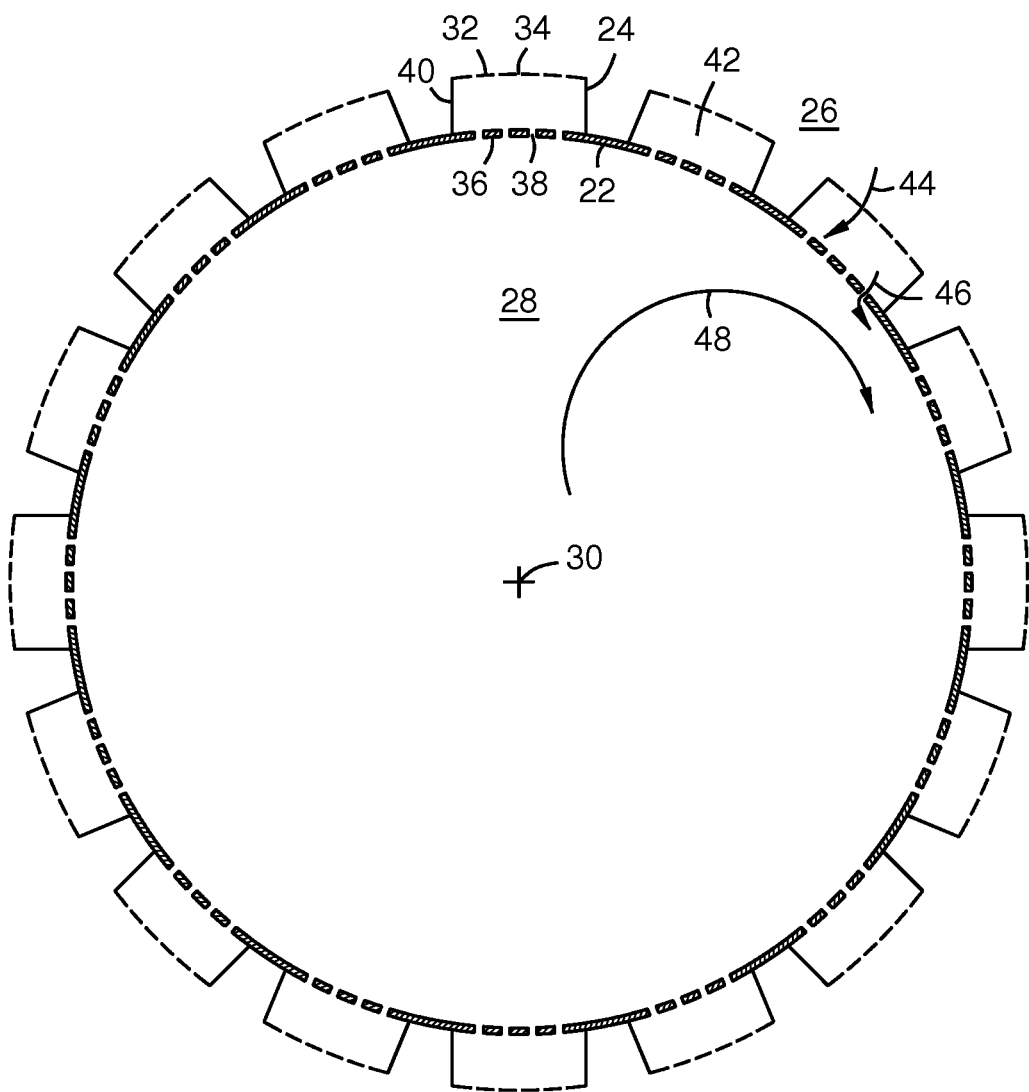

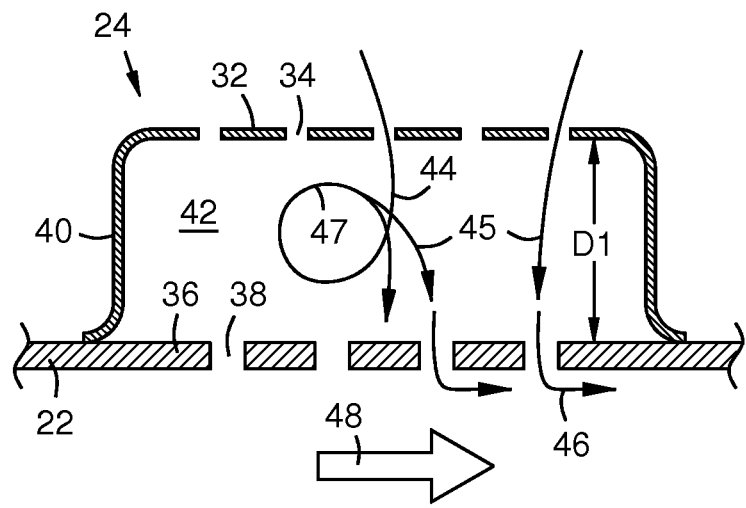
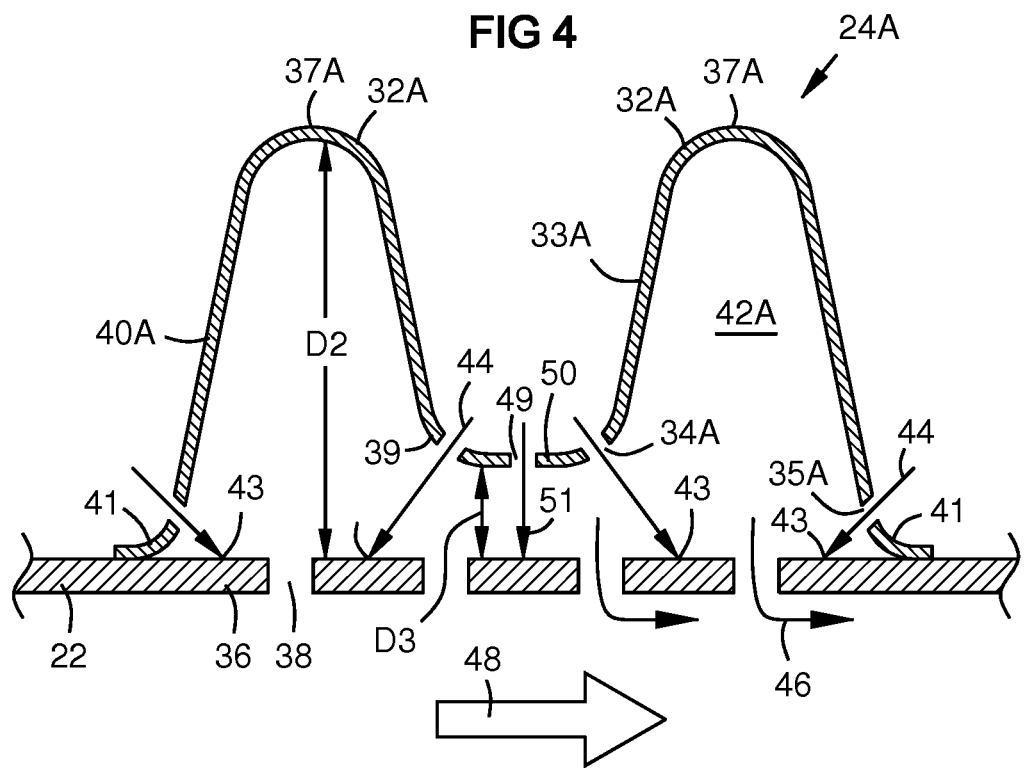

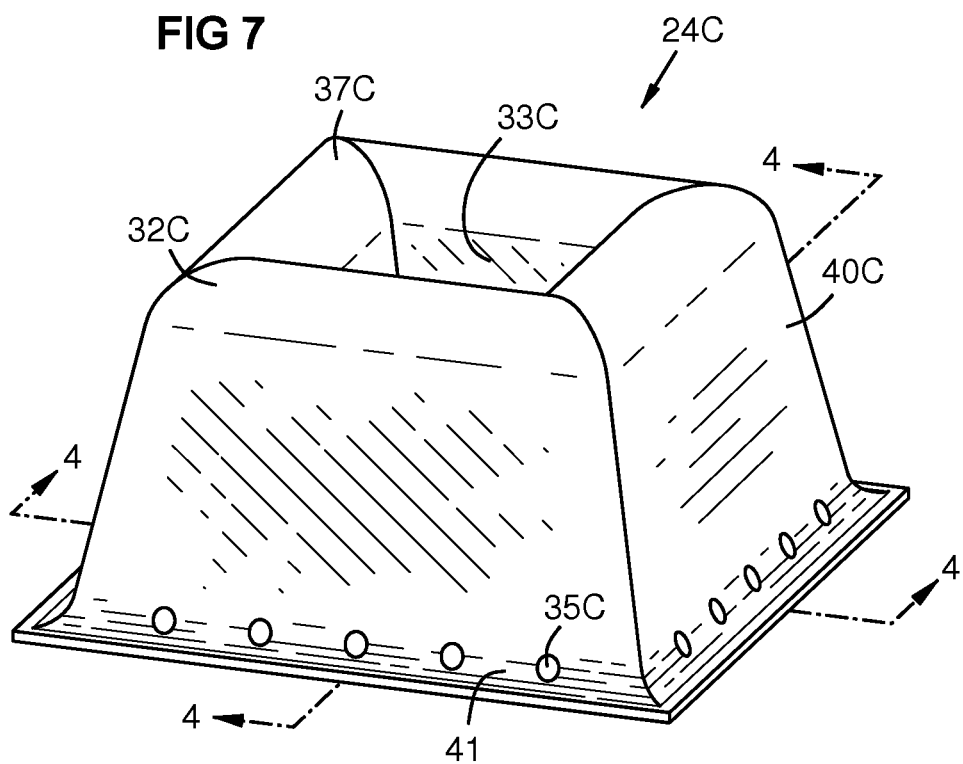

DAMPING RESONATOR WITH IMPINGEMENT COOLING

FIELD OF THE INVENTION

The invention relates to vibration damping acoustic resonators with impingement cooling, particularly for gas turbine components such as combustor liners and transition ducts.

BACKGROUND OF THE INVENTION

The use of damping devices such as Helmholtz resonators in turbine engines is known to dampen undesired frequencies of dynamics that may develop in the engine during operation. Examples are disclosed in U.S. Pat. No. 6,530,221.

One or more resonators can be attached to a surface of a turbine engine component such as a combustor liner by welding. Some resonators include passages through which air can enter and purge the cavity enclosed by the resonator. One beneficial byproduct of such airflow is that the component to which the resonator is attached can be impingement-cooled. That is, cooling air can pass through the passages and directly impinge on the hot surface underlying the resonator housing. One such example is U.S. Pat. No. 7,089,741 which shows resonators having side walls with cooling holes and an outer wall with purge holes.

The operational demands of some engines have necessitated resonators with greater damping effectiveness, which can be achieved by increasing the size of the resonators. However, a tradeoff to larger resonators is that the cooling holes become less effective in cooling the surface below, especially when resonator height is increased. As the distance between the impingement cooling holes and the hot surface beneath increases, the cooling air can disperse within the cavity of the resonator without impinging on the hot surface. As a result, the cooling is less effective. Thus, there can be concerns of overheating of the component and/or the welds between the resonator and the component, which can reduce the life cycle of these components.

Increased cooling air may be directed through larger resonators to improve cooling, but this reduces the amount of air that becomes premixed with the fuel, thereby providing a richer fuel mixture which burns hotter and can adversely affect emissions. Furthermore, increasing the coolant flow through the resonator can detune the resonator so that it no longer damps in its target frequency range. Alternately, additional resonators can be provided on the component. However, adding resonators at sub-optimal locations can provide less damping effectiveness than a larger resonator at an optimal location. Further, other design constraints, including space limitations, may limit the ability to attach more resonators at other locations.

BRIEF DESCRIPTION OF THE DRAWINGS

The invention is explained in the following description in view of the drawings that show:

FIG. 2 is a sectional view taken along line 2-2 of FIG. 1.

FIG. 3 is a side sectional view of a prior resonator taken along line 3-3 of FIG. 1.

FIG. 4 is a side sectional view of a resonator according to aspects of the invention.

FIG. 7 is a perspective view of a third embodiment of the invention.

DETAILED DESCRIPTION OF THE INVENTION

Figure 1:
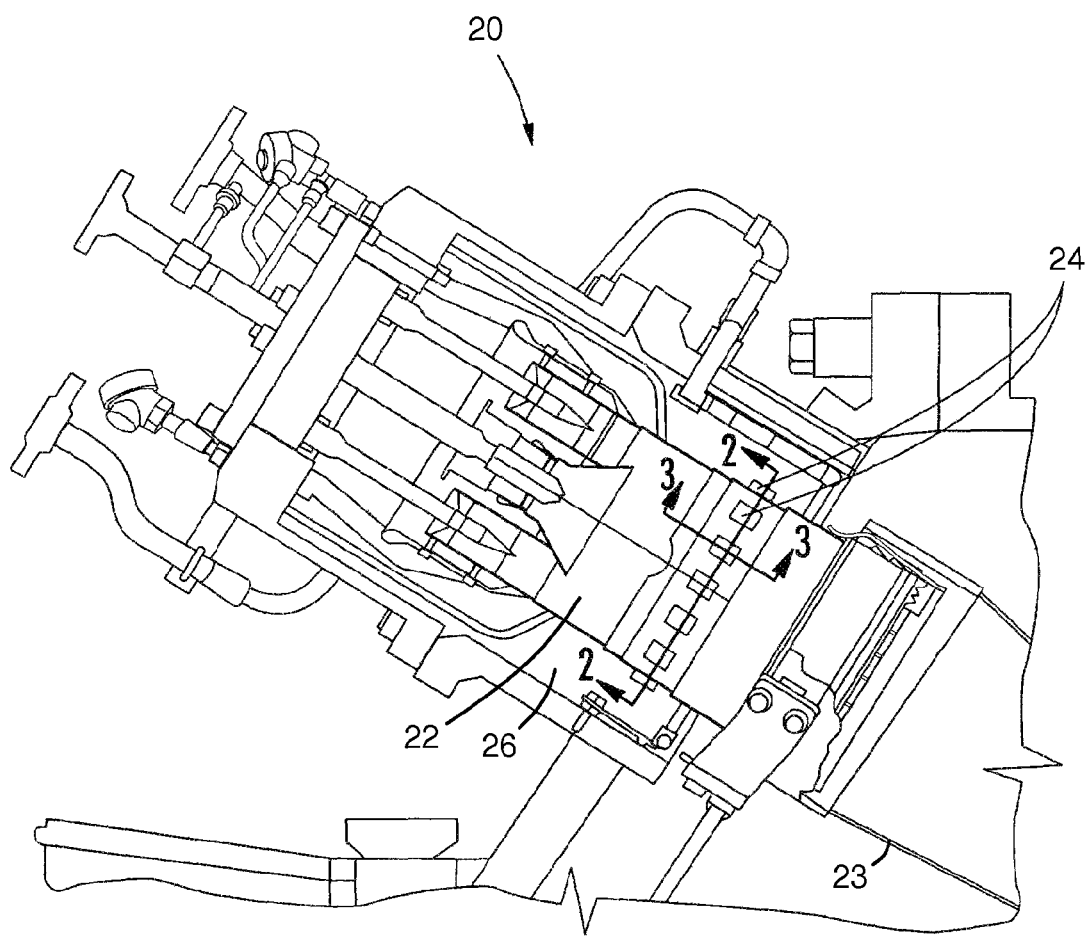
FIG. 1 is a schematic view of a prior gas turbine combustor assembly.

FIG. 1 shows a prior art combustor assembly 20, with a combustor liner 22, a circular array of damping resonators 24 on the liner, and an air plenum 26. An additional or alternate location for such resonators is on the transition duct 23 between the combustor assembly 20 and the turbine, or on other engine components enclosing a working gas flow path.

FIG. 2 is a sectional view of the combustor liner 22 of FIG. 1 taken on line 2-2 of FIG. 1 through the resonators 24. The liner 22 surrounds a combustion chamber 28, which may be generally cylindrical about an axis 30 or may have another shape. Each resonator 24 has an outer wall 32 with coolant inlet holes 34, an inner wall 36 with acoustic holes 38, and side walls 40 between the outer and inner walls 32, 36, forming a resonance chamber 42. The inner wall 36 is formed by the combustor liner 22 or other component wall bounding the working gas flow 48. The acoustic holes 38 may serve three functions: 1) to facilitate resonant vibrations as later described; 2) coolant exits; and 3) film cooling of the component wall 22.

The air plenum 26 receives compressed air from the engine compressor as known in the art. Some of this air 44 enters the coolant inlet holes 34 in the outer wall 32 of each resonator to cool the inner wall 36. It then escapes 46 into the combustion chamber 28, providing film cooling of the inner surface of the liner 22. The working gas 48 flows generally axially through the combustion chamber. It is shown in a circular swirl in this view for clarity.

FIG. 3 shows a side sectional view of a resonator 24 taken along line 3-3 of FIG. 1. Acoustic vibrations occur in each chamber 42 when the working gas 48 flows past the acoustic holes 38 in the liner 22. These vibrations are caused by fluid dynamic mechanisms such as Helmholtz resonance (as in pan flutes) and/or by a Karman Vortex (as in regular flutes), depending on the resonator and acoustic hole geometry. The resonator is tuned by its geometry and position such that it cancels unwanted frequencies in the combustor or other component to which it is attached. Methods and formulas for designing and tuning damping resonators are known, and are not detailed here.

Cooling air 44 travels a distance D1 from the outer wall 32 to the inner wall 36. This distance is dictated by the volume needed in the resonance chamber 42 to produce a given resonance within a given chamber perimeter. Distance D1 may be greater than is optimum for impingement cooling of the inner wall 36. The coolant 44 swirls and disperses 47 in the resonance chamber 42, thus impinging on the inner wall 36 indirectly. Some of the coolant does not impinge, as shown by flow arrows 45.

U.S. Pat. No. 7,413,053 improves this situation with tubes in the resonance chamber that carry the coolant from the outer wall to desired impingement locations on the inner wall. However, such tubes require a multi-part assembly of each resonator, thus adding complexity and expense. Furthermore, the coolant gains heat as it travels the length of each tube. The present invention eliminates these disadvantages.

FIG. 4 is a sectional view of a resonator 24A according to aspects of the invention. The outer wall 32A has one or more depressions 33A, each having a bottom portion 50 that is closer to the inner wall 36 than is a peak portion 37A of the outer wall. For example, distance D3 may be less than 60% of distance D2, or especially less than 40% of distance D2. The depression 33A may be generally bowl-shaped, trough-shaped, or other shapes. Coolant inlet holes 34A, 35A are located in the depression 33A and in the side walls 40A close to the inner wall 36. These holes are positioned to direct coolant flows 44 against the inner wall 36 at locations 43 on the inner wall apart from the acoustic holes 38, thus increasing cooling efficiency.

Some of the coolant inlet holes 49 may be located centrally in the bottom portion 50 of the depression 33A. Others of the coolant inlet holes 34A may be located in fillet areas of the bottom portion 50 of the depression 33A to direct some of the coolant 44 away from a central flow line 51 toward other locations 43 on the inner wall 36. Yet others of the coolant inlet holes 35A may be located in a bottom portion of the side walls 40A, and may be located adjacent to or within a fillet area 41 of the side walls 40A to direct coolant flows 44 close to the walls 40A. Thus, the coolant inlet holes 34A, 35A, 49 may be positioned to direct the coolant flows 44, 51 to impinge on the inner wall 36 out of alignment with the acoustic holes 38.

Peak portions 37A of the outer wall 32A may be more distant D2 from the inner wall than the distance D1 of a prior resonator with the same perimeter and resonance target, in order to provide sufficient volume in the chamber 42A for a desired resonance. The resonators 24A may be formed individually or in groups, for example by molding or sheet-metal stamping. The side walls, the outer wall, the depression, and the coolant inlet holes may be formed as a single sheet-metal part without a multi-part assembly. The side walls 40A may be bonded to the combustor liner 22 by welding or other means. The side walls 40A may be taller than a prior art resonator with the same perimeter to provide a volume in the resonance chamber 42A for a target resonance.

Figure 5:
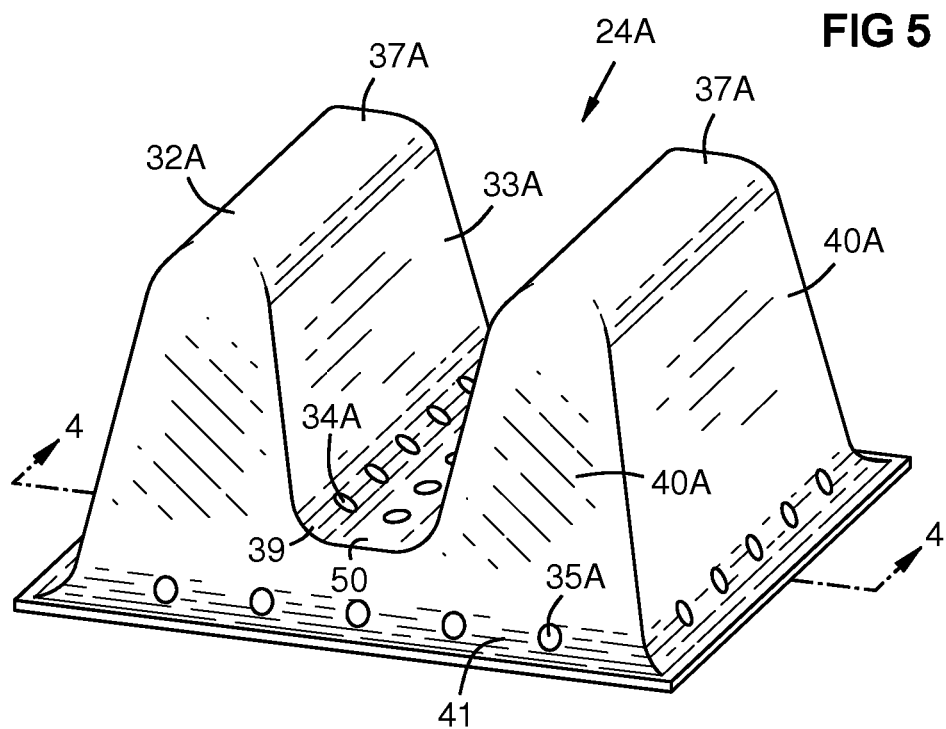
FIG. 5 is a perspective view of a first embodiment of the invention.
Figure 6:
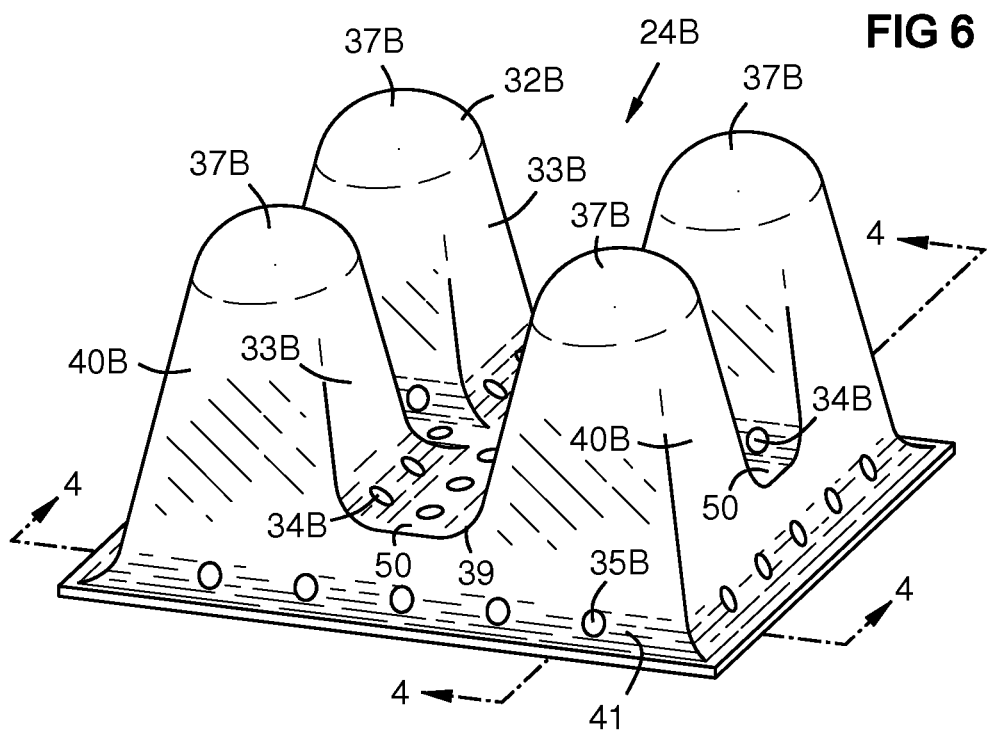
FIG. 6 is a perspective view of a second embodiment of the invention.

FIG. 5 is a perspective view of an embodiment 24A of the invention having a sectional view as in FIG. 4 when sectioned on line 4-4. The depression 33A is in the form of a trough. FIG. 6 shows an embodiment 24B with a cross-shaped depression 33B formed by two crossing trough-shaped depressions. It has side walls 40B, coolant inlet holes 34B, 35B, and four peaks 37B of the outer wall 32B. It may have a sectional view as in FIG. 4 in one or more directions sectioned on a line 4-4 between peaks 37B. Such a cross-shaped depression 33B can provide more coverage of coolant inlet holes 34B near the inner wall 36 when compared to the single trough of FIG. 5. This embodiment 24B may have additional peaks 37B—for example 6 or more—providing additional tuning options and component coverage options.

The embodiments of FIGS. 5 and 6 may have chambers with different volumes. For example in FIG. 5, the peaks 37A may have different heights. In FIG. 6, the peaks 37B may have one or more different heights. This provides further tuning options, such as tuning at more than one frequency, thus damping more than one frequency.

FIG. 7 shows an embodiment 24C with a bowl-shaped depression 33C. The depression 33C may be rectangular as shown or other bowl shapes, such as circular or oval. It has side walls 40C, coolant inlet holes 35C, and a peak 37C of the outer wall 32C. This embodiment may have a sectional view as in FIG. 4 in one or more directions as shown by two section lines 4-4.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A damping resonator comprising:
    a resonance chamber formed by an outer wall with coolant inlet holes, an inner wall with acoustic holes, and side walls spanning between the inner and outer walls;
    a depression in the outer wall comprising a bottom portion that is closer to the inner wall than is a first peak portion of the outer wall;
    the coolant inlet holes distributed along the bottom portion of the depression;
    wherein the coolant inlet holes are close enough to the inner wall for effective impingement cooling thereof, and are located to direct coolant flows toward impingement locations on the inner wall apart from the acoustic holes;
    wherein the first peak portion of the outer wall is disposed at a first distance from the inner wall, and the bottom portion of the depression is disposed at a second distance from the inner wall that is less than 60% of the first distance.

2. A damping resonator as in claim 1, wherein at least some of the coolant inlet holes are positioned in a fillet area of the bottom portion of the depression.

3. A damping resonator as in claim 2, wherein others of the coolant inlet holes are positioned in a central area of the bottom portion of the depression.

4. A damping resonator as in claim 3, wherein the bottom portion of the depression is less than 40% as far from the inner wall as the first peak portion of the outer wall, and further comprising additional coolant inlet holes in the side walls.

5. A damping resonator as in claim 3, wherein the depression forms a trough in the outer wall.

6. A damping resonator as in claim 1, wherein the depression is cross-shaped, and the outer wall comprises four peaks.

7. A damping resonator as in claim 1, wherein the depression is bowl-shaped.

8. A damping resonator as in claim 1, wherein the inner wall is formed by a portion of a gas turbine combustor liner or a gas turbine transition duct; the bottom portion of the depression is less than 40% as far from the inner wall as the first peak portion of the outer wall; and further comprising a second peak portion of the outer wall with a different height than the first peak portion of the outer wall.

9. A damping resonator comprising:
    an inner wall with acoustic holes, wherein the inner wall is formed by a wall of a gas turbine component that bounds a working gas flow of the gas turbine;
    an outer wall comprising a peak portion at a first distance from the inner wall;
    side walls spanning between the inner and outer walls, forming a resonance chamber therebetween;
    a depression in the outer wall comprising a bottom portion at a second distance from the inner wall that is less than 60% of the first distance;
    coolant inlet holes distributed along the bottom portion of the depression located to direct respective coolant flows toward respective impingement locations on the inner wall apart from the acoustic holes.

10. A damping resonator as in claim 9, wherein at least some of the coolant inlet holes are positioned in a fillet area of the bottom portion of the depression.

11. A damping resonator as in claim 10, wherein others of the coolant inlet holes are positioned in a central area of the bottom portion of the depression.

12. A damping resonator as in claim 11, wherein the bottom portion of the depression is less than 40% as far from the inner wall as the first peak portion of the outer wall, and further comprising additional coolant inlet holes in the side walls.

13. A damping resonator as in claim 12, wherein the depression forms a trough in the outer wall.

14. A damping resonator as in claim 9, wherein the depression is cross-shaped, and the outer wall comprises four peaks.

15. A damping resonator as in claim 9, wherein the depression is bowl-shaped.

16. A damping resonator as in claim 9, wherein the inner wall is formed by a portion of a gas turbine combustor liner, and the bottom portion of the depression is less than 40% as far from the inner wall as the peak portion of the outer wall.

17. A damping resonator for a gas turbine component, comprising:

an outer wall comprising a plurality of peak portions;
an inner wall with acoustic holes;
side walls between the inner and outer walls forming a resonance chamber;
a depression in the outer wall, the depression comprising a bottom portion disposed at a second distance from the inner wall that is less than 40% of a first distance of from the inner wall of at least one of the peak portions on the outer wall; and
coolant inlet holes positioned along the bottom portion of the depression to direct coolant flows toward impingement locations on the inner wall apart from the acoustic holes.

18. A damping resonator as in claim 17, wherein some of the coolant inlet holes are positioned in fillet areas of the bottom portion of the depression.

19. A damping resonator as in claim 18, wherein others of the coolant inlet holes are positioned centrally in the bottom portion of the depression.

20. A damping resonator as in claim 17, further comprising additional coolant inlet holes in the side walls, wherein the peaks in the outer wall are of at least two different heights, providing at least two respective tuning frequencies.

* * * * *